United States Patent
Yagisawa

(10) Patent No.: US 10,171,230 B2
(45) Date of Patent: Jan. 1, 2019

(54) HOMOMORPHIC ENCRYPTION SCHEME

(71) Applicant: Empire Technology Development LLC, Wilmington, DE (US)

(72) Inventor: Masahiro Yagisawa, Yokohama (JP)

(73) Assignee: Empire Technology Development LLC, Wilmington, DE (US)

( * ) Notice: Subject to any disclaimer, the term of this patent is extended or adjusted under 35 U.S.C. 154(b) by 198 days.

(21) Appl. No.: 14/895,060

(22) PCT Filed: Feb. 28, 2014

(86) PCT No.: PCT/US2014/019204
§ 371 (c)(1),
(2) Date: Dec. 1, 2015

(87) PCT Pub. No.: WO2015/130297
PCT Pub. Date: Sep. 3, 2015

(65) Prior Publication Data
US 2016/0127125 A1    May 5, 2016

(51) Int. Cl.
*H04L 29/06* (2006.01)
*H04L 9/06* (2006.01)
*H04L 9/00* (2006.01)
*H04L 9/14* (2006.01)

(52) U.S. Cl.
CPC ............ *H04L 9/0618* (2013.01); *H04L 9/008* (2013.01); *H04L 9/14* (2013.01); *H04L 2209/24* (2013.01)

(58) Field of Classification Search
CPC ................................ H04L 9/008; H04L 9/321
See application file for complete search history.

(56) References Cited

U.S. PATENT DOCUMENTS

| 5,870,477 A | 2/1999 | Sasaki et al. |
| 8,515,058 B1 | 8/2013 | Gentry |
| 8,782,684 B2 * | 7/2014 | Han ................. H04N 21/25891 725/14 |

(Continued)

FOREIGN PATENT DOCUMENTS

| WO | 2002001792 A1 | 1/2002 |
| WO | 2015130297 A1 | 9/2015 |

OTHER PUBLICATIONS

Malekian et al., OTRU—A Non-Associative and High Speed Public Key Cryptosystem, May 2009, https://www.math.uci.edu/~brusso/cryptographyORTU.pdf (Year: 2009).*

(Continued)

*Primary Examiner* — Chau Le

(57) ABSTRACT

Technologies are generally described for providing a fully homomorphic encryption scheme. In some examples, a method performed under control of a first device may include determining an enciphering function, based at least in part on a secret key of the first device and a system parameter; enciphering a plaintext into a first ciphertext, based at least in part on the enciphering function; transmitting, to a server, the first ciphertext and the system parameter; receiving, from a second device, a second ciphertext to which the first ciphertext has been processed by the second device without deciphering the first ciphertext; and deciphering the second ciphertext, based at least in part on the system parameter and a deciphering function.

11 Claims, 11 Drawing Sheets

(56) References Cited

U.S. PATENT DOCUMENTS

| | | | |
|---|---|---|---|
| 9,819,650 B2* | 11/2017 | Soon-Shiong | H04L 63/0428 |
| 9,870,462 B2* | 1/2018 | Trika | G06F 21/44 |
| 2002/0191764 A1 | 12/2002 | Hori et al. | |
| 2006/0280308 A1* | 12/2006 | Anshel | H04L 9/0841 |
| | | | 380/285 |
| 2011/0110525 A1 | 5/2011 | Gentry | |
| 2011/0243320 A1 | 10/2011 | Halevi et al. | |
| 2012/0039473 A1 | 2/2012 | Gentry et al. | |
| 2013/0086390 A1* | 4/2013 | Kennedy | G06F 21/62 |
| | | | 713/189 |
| 2013/0097417 A1* | 4/2013 | Lauter | H04L 9/008 |
| | | | 713/150 |
| 2013/0170640 A1 | 7/2013 | Gentry | |
| 2013/0216044 A1 | 8/2013 | Gentry et al. | |
| 2013/0230168 A1* | 9/2013 | Takenouchi | G06F 21/6209 |
| | | | 380/46 |
| 2013/0275752 A1* | 10/2013 | Zhang | H04L 9/008 |
| | | | 713/167 |
| 2013/0329883 A1 | 12/2013 | Tamayo-Rios | |
| 2013/0339722 A1 | 12/2013 | Krendelev et al. | |
| 2014/0177828 A1 | 6/2014 | Loftus et al. | |
| 2015/0244517 A1* | 8/2015 | Nita | H04L 9/008 |
| | | | 713/168 |
| 2015/0312029 A1* | 10/2015 | Seo | H04L 9/008 |
| | | | 380/28 |
| 2016/0013933 A1* | 1/2016 | Teranishi | H04L 9/065 |
| | | | 380/28 |
| 2016/0087790 A1* | 3/2016 | Karame | H04L 9/0618 |
| | | | 380/28 |

OTHER PUBLICATIONS

Armonk, N.Y., "IBM Researcher Solves Longstanding Cryptographic Challenge," accessed at http://web.archive.org/web/20140225162739/http://www-03.ibm.com/press/us/en/pressrelease/27840.wss, posted on Jun. 25, 2009, pp. 2.

Bardet, M., et al., "On the complexity of Gröbner basis computation of semi-regular overdetermined algebraic equations," Proceeding of the International Conference on Polynomial System Solving ICPSS'2004, pp. 1-4 (Nov. 2004).

Cohen, B., "Cohen's cryptosystem," accessed at https://en.wikipedia.org/wiki/Cohen%27s_cryptosystem, last modified on Sep. 11, 2015, pp. 2.

Cooney, M., "IBM touts encryption innovation," Network World, accessed at http://www.computerworld.com/article/2526031/security0/ibm-touts-encryption-innovation.html, posted on Jun. 25, 2009, pp. 2.

Dijk, M. V., et al., "Fully Homomorphic Encryption over the Integers," Eurocrypt 2010, pp. 1-28 (Jun. 8, 2010).

Gentry, C., "A Fully Homomorphic Encryption Scheme," accessed at http://web.archive.org/web/20131213140201/http://crypto.stanford.edu/craig/craig-thesis.pdf, pp. 1-209 (Sep. 2009).

Gentry, C., "Computing Arbitrary Functions of Encrypted Data," Communications of the Association for Computing Machinery, vol. 53, Issue 3, pp. 97-105 (Mar. 2010).

Gentry, C., "Fully Homomorphic Encryption Using Ideal Lattices," STOC '09 Proceedings of the forty-first annual ACM symposium on Theory of computing, pp. 169-178 (May 31-Jun. 2, 2009).

International Search Report and Written Opinion for International Application No. PCT/US2014/019204, dated Jul. 21, 2014.

Matsumoto, T., et al., "Public quadratic polynomial-tuples for efficient signature verification and message-encryption," Lecture Notes in Computer Science on Advances in Cryptology—EUROCRYPT'88, pp. 419-453 (1988).

Rivest, R. L., et al., "On data banks and privacy homomorphisms. In Foundations of Secure Computation," Foundations of secure computation, vol. 4, Issue 11, pp. 169-180 (1978).

Shai, H., "An Implementation of homomorphic encryption," accessed at http://web.archive.org/web/20140729020200/https://github.com/shaih/HElib, posted on Apr. 17, 2014, p. 1.

Silverberg, A., "Fully Homomorphic Encryption for Mathematicians," accessed at http://web.archive.org/web/20140131043855/http://eprint.iacr.org/2013/250.pdf, accessed on Nov. 3, 2015, pp. 11.

Stehlé, D., and Steinfeld, R., "Faster Fully Homomorphic Encryption," accessed at http://web.archive.org/web/20130624182726/http://eprint.iacr.org/2010/299.pdf, pp. 1-25 (May 19, 2010).

Tsujii, S., et al., "Piece in Hand Concept for Enhancing the Security of Multivariate Type Public Key Cryptosystems: Public Key Without Containing All the Information of Secret Key," Cryptology ePrint Archive, pp. 1-32 (2004).

Tsujii, S., et al., "Proposal of Integrated MPKC: PPS—STS Enhanced by Perturbed Piece in Hand Method," IEICE Tech. Rep., vol. 109, No. 113, ISEC2009-27, pp. 139-146 (Jun. 25, 2009).

Wolf, C., and Preneel, B., "Taxonomy of Public Key Schemes based on the problem of Multivariate Quadratic equations," Cryptology ePrint Archive, Report 2005/077, pp. 1-64 (2005).

"Association for Computing Machinery," accessed at http://web.archive.org/web/20140226103345/http://en.wikipedia.org/wiki/Association_for_Computing_Machinery, last modified on Feb. 24, 2014, pp. 10.

Agarwal, A., "Security Enhancement Scheme for Image Steganography using S-DES Technique," International Journal of Advanced Research in Computer Science and Software Engineering, vol. 2, Issue 4, pp. 1-6 (Apr. 2012).

Boneh, D., and Freeman, D.M., "Homomorphic Signatures for Polynomial Functions," Advances in Cryptology—EUROCRYPT 2011 Lecture Notes in Computer Science, vol. 6632, pp. 149-168 (Apr. 5, 2011).

Catalano, D. et al., "Homomorphic signatures with efficient verification for polynomial functions," Lecture Notes in Computer Science, vol. 8616, pp. 371-389 (Jun. 13, 2014).

Extended European Search Report for European Application No. EP 16199559.2 dated May 12, 2017, pp. 10.

Gorbunov, S. et al., "Leveled Fully Homomorphic Signatures from Standard Lattices," Proceedings of the forty-seventh annual ACM symposium on Theory of computing, pp. 469-477 (Jun. 14, 2015).

Gupta, S. et al., "Information Hiding Using Least Significant Bit Steganography and Cryptography," I. J. Modern Education and Computer Science, vol. 6, pp. 27-34 (Jun. 4, 2012).

M, H. K. and Vijaya, P.A., "Secure data hiding algorithm using encrypted secret message," International Journal of Scientific and Research Publications, vol. 2, Issue 6, pp. 1-4 (Jun. 2012).

Nath, J. and Nath, A., "Advanced Steganography Algorithm using Encrypted secret message," International Journal of Advanced Computer Science and Applications, vol. 2, No. 3, pp. 19-24 (Mar. 2011).

Nuida, K. and Kurosawa, K., "(Batch) Fully Homomorphic Encryption over Integers for Non-Binary Message Spaces," Advance of Cryptology, vol. 9056, pp. 537-555 (2015).

P. J. et al., "Information hiding using audio stegnography—A Survey," The International Journal of Multimedia & Its Applications (IJMA), vol. 3, No. 3, pp. 86-96 (Aug. 2011).

Parakh, A. and Mahoney, W., "Privacy Preserving Computations Using Implicit Security," 22nd International Conference on Computer Communications and Networks, pp. 1-6 (2013).

Sarmah, D.K. and Bajpai, N., "Proposed System for data hiding using Cryptography and Steganography," International Journal of computer applications, vol. 8, No. 9, pp. 7-10 (Oct. 2010).

Singh, G., et al., "Superiority of Blowfish Algorithm in Wireless Networks," International Journal of Computer Applications, vol. 44, No. 11, pp. 23-26 (Apr. 2012).

Smart, N. and Vercauteren, F., "Fully Homomorphic Encryption with Relatively Small Key and Ciphertext Sizes," Proceedings of the 13th international conference on Practice and Theory in Public Key Cryptography, vol. 6056, pp. 420-443 (May 26, 2010).

Tetali, S. D. et al., "MrCrypt: static analysis for secure cloud computations," Proceedings of the 2013 ACM SIGPLAN international conference on Object oriented programming systems languages & applications, vol. 48, Issue 10, pp. 271-286 (Oct. 2013).

Tyagi, V., "Data Hiding in Image using least significant bit with cryptography," in International Journal of Advanced Research in Computer Science and Software Engineering, vol. 2, Issue 4, pp. 120-123 (Apr. 2012).

(56) References Cited

OTHER PUBLICATIONS

Vennice, M., et al., "Hiding the Text Information using Stegnography," International Journal of Engineering Research and Applications (IJERA), vol. 2, Issue 1, pp. 126-131 (Jan.-Feb. 2012).
Vitthal, P. S. et al., "A Novel Security Scheme for Secret Data using Cryptography and Steganography," International Journal of Computer Network and Information Security Information, vol. 4, No. 2, pp. 36-42 (Mar. 2012).
Yagisawa, M. et al., "Key distribution system and attribute-based encryption on non-commutative ring," pp. 1-9 (2012).
Yagisawa, M., "Fully Homomorphic Encryption on Octonion Ring," International Association for Cryptologic Research, XP061018931, pp. 1-42 (Jul. 22, 2015).
Boneh, D., and Freeman, D.M., "Homomorphic Signatures for Polynomial Functions," Advances in Cryptology—EUROCRYPT 2011 Lecture Notes in Computer Science, vol. 6632, pp. 149-168 (2011).
Catalano, D. et al., "Homomorphic signatures with efficient verification for polynomial functions," Lecture Notes in Computer Science, vol. 8616, pp. 371-389 (2014).

\* cited by examiner

HOMOMORPHIC ENCRYPTION SCHEME

CROSS-REFERENCE TO RELATED APPLICATIONS

This Application is a U.S. National Stage filing under 35 U.S.C. § 371 of International Application No. PCT/US14/19204, filed on Feb. 28, 2014. The disclosure of International Application No. PCT/US14/19204 is hereby incorporated herein by reference in its entirety.

BACKGROUND

Encryption schemes that support operations on encrypted data may have a very wide range of applications in cryptography. A fully homomorphic encryption scheme may be considered as one that may allow computations of arbitrary functions over encrypted data without requiring the use of a decryption key.

SUMMARY

In an example, a method performed under control of a first device may include determining an enciphering function, based at least in part on a secret key of the first device and a system parameter; enciphering a plaintext into a first ciphertext, based at least in part on the enciphering function; transmitting, to a server, the first ciphertext and the system parameter; receiving, from a second device, a second ciphertext to which the first ciphertext has been processed by the second device without deciphering the first ciphertext; and deciphering the second ciphertext, based at least in part on the system parameter and a deciphering function.

In another example, a method performed under control of a first device may include receiving, from a second device, a request to process a plaintext; downloading, from a server, a system parameter and a first ciphertext that corresponds to the plaintext, based at least in part on the received request; generating a second ciphertext by calculating the first ciphertext, based at least in part on the received request; and transmitting, to the second device, the generated second ciphertext.

In yet another example, a method performed under control of a server may include receiving, from a first device, a system parameter and a first ciphertext to which a plaintext is enciphered, based at least in part on the system parameter and a first secret key of the first device; receiving, from the first device, a first re-encryption key and a second re-encryption key; converting the first ciphertext to a second ciphertext, based at least in part on the first re-encryption key and the second re-encryption key; and transmitting, to a second device, the second ciphertext.

In yet another example, a method performed under control of a first device may include receiving, from a server, a first ciphertext to which a second ciphertext is converted, based on a first re-encryption key and a second re-encryption key; receiving, from a second device, a first decryption key and a second decryption key; and deciphering the received first ciphertext to a plaintext, based at least in part on the received first decryption key and the second decryption key.

In yet another example, a first device may include a function manager configured to determine an enciphering function, based at least in part on a secret key of the first device and a system parameter; an encipherer configured to encipher a plaintext into a first ciphertext, based at least in part on the enciphering function; a transmitter configured to transmit, to a server, the first ciphertext and the system parameter; a receiver configured to receive, from a second device, a second ciphertext to which the first ciphertext has been processed by the second device without deciphering the first ciphertext; and a decipherer configured to decipher the second ciphertext, based at least in part on the system parameter and a deciphering function.

In yet another example, a first device may include a receiver configured to: receive, from a second device, a request to process a plaintext, and download, from a server, a system parameter and a first ciphertext that corresponds to the plaintext, based at least in part on the received request; a calculator configured to calculate the first ciphertext to generate a second ciphertext, based at least in part on the received request; and a transmitter configured to transmit, to the second device, the generated second ciphertext.

In yet another example, a server may include a receiver configured to: receive, from a first device, a system parameter and a first ciphertext to which a plaintext is enciphered, based at least in part on the system parameter and a first secret key of the first device, and receive, from the first device, a first re-encryption key and a second re-encryption key; a converter configured to convert the first ciphertext to a second ciphertext, based at least in part on the first re-encryption key and the second re-encryption key; and a transmitter configured to transmit, to a second device, the second ciphertext.

In yet another example, a first device may include a receiver configured to: receive, from a server, a first ciphertext to which a second ciphertext is converted, based at least in part on a first re-encryption key and a second re-encryption key, and receive, from a second device, a first decryption key and a second decryption key; and a decipherer configured to decipher the received first ciphertext to a plaintext, based at least in part on the received first decryption key and the second decryption key.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
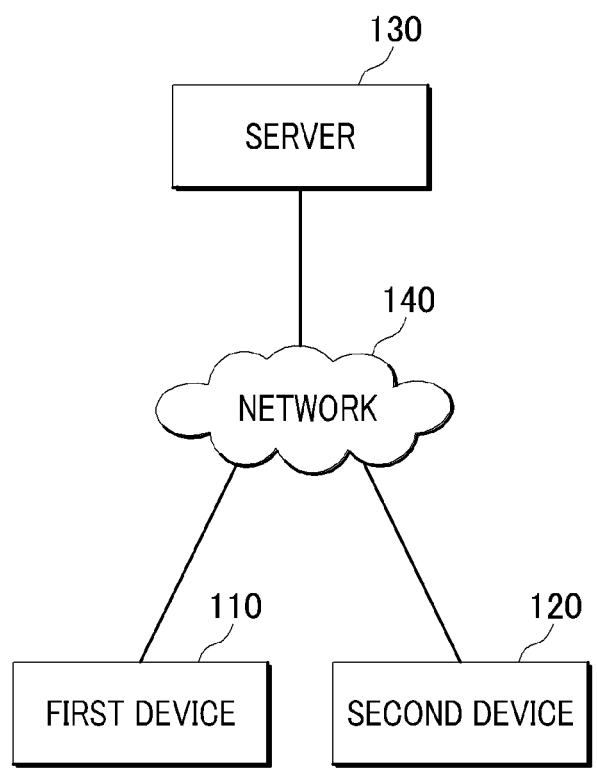
FIG. 1 schematically shows an illustrative example of a system including a first device, a second device and a server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a fully homomorphic encryption scheme. Technologies are generally described for a method for executing computations and/or operations on encrypted data without decrypting the encrypted data.

In some embodiments, a first device may be configured to encrypt a plaintext to generate a first ciphertext, based at least in part on an enciphering function. The enciphering function may be determined based on a secret key of the first device and a system parameter. The system parameter may be a prime number greater than two. The first device may be further configured to then transmit, to a server, the first ciphertext and the system parameter.

Further, the first device may be configured to transmit, to a second device, a request to execute and/or process a calculation associated with the plaintext. For example, the request may include information regarding a kind of calculation (e.g., addition, subtraction, multiplication or division) and calculation targets from among the plaintext. When the second device receives the request from the first device, the second device may be configured to download, from the server, the first ciphertext that corresponds to the requested plaintext, based at least in part on the received request. The second device may be further configured to receive, from the server, the system parameter. Further, the second device may be configured to generate a second ciphertext by executing a calculation on the downloaded first ciphertext, based on the received request. Thus, the second device may be configured to process a calculation on the first ciphertext without decrypting the first ciphertext, and to generate an encrypted result (i.e., the second ciphertext) of the calculation. Further, the second device may be configured to transmit the generated second ciphertext to the first device. Thus, the first device may be configured to receive, from the second device, the encrypted result of the calculation associated with the requested plaintext. Further, the first device may be configured to decrypt the second ciphertext, based on the system parameter and a deciphering function. The first device may be configured to then obtain a decrypted process result that may be equal to a result of the calculation on the requested plaintext. Thus, the first device may be configured to obtain a process result of encrypted data without revealing original data to other third parties, based on the fully homomorphic encryption scheme.

FIG. 1 schematically shows an illustrative example of a system 10 including a first device 110, a second device 120 and a server 130, arranged in accordance with at least some embodiments described herein. As illustrated in FIG. 1, first device 110, second device 120 and server 130 may be connected to each other via a network 140. Network 140 may refer to a component or module that may be configured to communicatively couple two or more of first device 110, second device 120 and server 130. Non-limiting examples of network 140 may include a wired network such as a LAN (Local Area Network), a WAN (Wide Area Network), a VAN (Value Added Network) or the like, or various other wireless networks such as a mobile radio communication network including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), or the like. Alternatively, network 140 may include at least one of a near field communication (NFC), Bluetooth, or peer to peer (P2P) communication protocol.

For example, but not as a limitation, respective one of first device 110 and second device 120 may refer to at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), PDA (Personal Digital Assistant). First device 110 and second device 120 may be capable of full duplex radio communications. Further, for example, server 130 may include a cloud datacenter.

In some embodiments, first device 110 may be configured to select a system parameter. For example, the system parameter may be represented by "q". The system parameter may be a prime number which may be engaged in a non-associative octonion ring and be greater than two. Further, first device 110 may be configured to select a secret key of first device 110, randomly. For example, the secret key may be represented by "[$A_i$ (i=0, . . . , 7)]". An inverse value of the secret key may exist, and the secret key may be engaged in a non-associative octonion ring, usually represented by "O".

First device 110 may be further configured to generate and/or determine an enciphering function and a deciphering function of first device 110, which may be engaged in a non-associative octonion ring, based at least in part on the system parameter and the secret key. For example, the enciphering function may be represented by "E(M,X)" and the deciphering function may be represented by "D(M,X)". Further, first device 110 may be configured to encipher a plaintext into a first ciphertext, based at least in part on the enciphering function, system parameter and secret key of first device 110. For example, the plaintext may include multiple plaintext elements which may be engaged in a non-associative octonion ring. For example, the plaintext may be represented by "$M_i=(m_i, \ldots, m_{i7})$ (i=0, ..., n-1)". Further, the first ciphertext may include multiple first ciphertext elements which may be engaged in a non-associative octonion ring. For example, the first ciphertext may be represented by "$C_i(X)=[ei_{jk}]$(i=0, ..., n-1;j,k=0, ..., 7)]". For example, first device 110 may be configured to encipher the plaintext into the first ciphertext by using the below formula 1. Further, "X" may be a variable, represented by "$X=(x_0, \ldots, x_7)$".

$$C(X) = E(M_i, X) = A_1( \ldots \quad \text{[formula 1]}$$
$$(A_k(M_i(A_k^{-1}( \ldots (A_1^{-1}X) \ldots ) \ldots )\bmod q \in O[X],$$
$$= (ei_{00}x_0 + ei_{01}x_1 + \ldots + ei_{07}x_7,$$
$$ei_{10}x_0 + ei_{11}x_1 + \ldots + ei_{17}x_7,$$
$$\ldots \quad \ldots$$
$$ei_{70}x_0 + ei_{71}x_1 + \ldots + ei_{77}x_7),$$
$$= [ei_{jk}](j, k = 0, \ldots, 7)$$

with $ei_{jk} \in Fq (i = 0, \ldots, n-1; j, k = 0, \ldots, 7)$.

Further, first device 110 may be configured to transmit the first ciphertext "[$ei_{jk}$]" and the system parameter "[q]" to server 130.

First device 110 may be further configured to transmit, to second device 120, a request to process computations or calculations on the plaintext. For example, the request may include information regarding a kind of calculation (e.g., addition, subtraction, multiplication or division) and calculation targets (i.e., plaintext elements) from among the multiple plaintext elements. For example, first device 110 may be configured to request values of ciphertexts that corresponds to "$M_1+M_2+M_3)/(M_2M_3)$". Further, for example, first device 110 may be configured to transmit, to second device 120, a request for an encrypted result of computations on the first ciphertext elements that correspond to the requested plaintext elements.

Second device 120 may be configured to receive, from first device 110, the request to process computations or calculations on the plaintext. Further, second device 120 may be configured to download, from server 130, the first ciphertext that corresponds to the requested plaintext, based at least in part on the received request. For example, second device 120 may be configured to download, from server 130, multiple first ciphertext elements "[$e1_{jk}, e2_{jk}, e3_{jk}$]" that correspond to multiple plaintext elements "$M_1, M_2, M_3$" which are requested to be processed. Further, second device 120 may be configured to download, from server 130, the system parameter.

Second device 120 may be further configured to generate a second ciphertext by executing computations or calculations on the downloaded first ciphertext, based on the received request. Second device 120 may be configured to process computations or calculations on the first ciphertext without decrypting the first ciphertext, and to generate an encrypted result (i.e., the second ciphertext) of the calculations. For example, the second ciphertext may include multiple second ciphertext elements which may be engaged in a non-associative octonion ring. For example, second device 120 may be configured to generate the second ciphertext by using the below formula 2.

$$C_1(X)=[e1_{jk}](j,k=0,\ldots,7)$$

$$C_2(X)=[e2_{jk}](j,k=0,\ldots,7)$$

$$C_3(X)=[e3_{jk}](j,k=0,\ldots,7)$$

$$K_1(X)=C_1(X)+C_2(X)+C_3(X)\bmod q$$

$$K_2(X)=C_2(C_3(X))\bmod q,$$

$$K_3(X)=K_2(X)^{(-1)}\bmod q$$

$$C^*=K_1(K_5(X))\bmod q=[c^*_{ij}(i,j=0,\ldots,7)] \quad \text{[formula 2]}$$

Further, second device 120 may be configured to transmit the generated second ciphertext "[$C^*_{ij}$]" to first device 110. Further, first device 110 may be configured to receive, from second device 120, the second ciphertext as the encrypted result of the calculations, to which the first ciphertext associated with the requested plaintext has been processed and converted. Further, first device 110 may be configured to decipher the second ciphertext, based at least in part on the system parameter and the deciphering function. For example, first device 110 may be configured to decipher the second ciphertext by using the below formula 3.

$$A_k^{-1}( \ldots (A_1^{-1}(C^*[A_1( \ldots (A_k(1) \ldots )] \ldots) = A_k^{-1} \quad \text{[formula 3]}$$
$$( \ldots (A_1^{-1}(K_1(K_3[A_1( \ldots (A_k(1) \ldots )]))) \ldots ) =$$
$$A_k^{-1}( \ldots (A_1^{-1}(A_1( \ldots$$
$$(A_k[[M_1 + M_2 + M_3](A_k^{-1}( \ldots$$
$$[A_1^{-1}[A_1( \ldots (A_k(M_3^{-1}(M_2^{-1}$$
$$(A_k^{-1}\{ \ldots (A_1^{-1}(A_1( \ldots (A_k(1)$$
$$\ldots ) \ldots )\}) = [M_1 + M_2 + M_3]$$
$$(M_3^{-1}(M_2^{-1}\{A_k^{-1}( \ldots (A_1^{-1}$$
$$(A_1( \ldots (A_k(1) \ldots) = [M_1 +$$
$$M_2 + M_3](M_3^{-1}(M_2^{-1})) = [M_1 +$$
$$M_2 + M_3](M_2M_3)^{-1} = [M_1 +$$
$$M_2 + M_3]/(M_2M_3) \bmod q.$$

First device 110 may be configured to then obtain a deciphered process result that may be equal to a result of the requested computations or calculations on the requested plaintext. Thus, based on the fully homomorphic encryption scheme, first device 110 may be configured to obtain a calculation result of encrypted plaintexts without revealing original plaintexts to second device 120, and may be configured to obtain a calculation result of the original plaintexts by deciphering the calculation result of encrypted plaintexts.

In some other embodiments, first device 110 may be configured to select a system parameter. The system parameter may be a prime number which may be engaged in a non-associative octonion ring and be greater than two. Further, first device 110 may be configured to select a first secret key of first device 110 and a second secret key of first device 110, randomly. An inverse value corresponding to each of the first secret key and the second secret key may exist. Further, the first secret key and the second secret key may be engaged in a non-associative octonion ring. For example, the first secret key may be represented by "[$A_i$ (i=0, . . . , 7)]" and the second secret key may be represented by "[$B_i$ (i=0, . . . , 7)]".

Further, first device 110 may be configured to generate a first re-encryption key and a second re-encryption key, based at least in part on the system parameter, the first secret key and the second secret key. The first re-encryption key and the second re-encryption key may refer to keys to be used to convert a first ciphertext which is enciphered by the first secret key into a second ciphertext which is enciphered by the second secret key. Further, the first re-encryption key and the second re-encryption key may be engaged in a non-associative octonion ring. For example, the first re-encryption key may be represented by "$K_{RE}1(X)=B_1( \ldots (B_k(A_k^{-1}( \ldots (A_1^{-1}(X) \ldots )$" and the second re-encryption key may be represented by "$K_{RE}2(X)=A_1( \ldots (A_k(B_k^{-1}( \ldots (B_1^{-1}X) \ldots )$".

Further, first device 110 may be configured to generate a first decryption key and a second decryption key, based at least in part on the second secret key and the system parameter. The first decryption key and the second decryption key may refer to keys to be used to decipher the second ciphertext to which a plaintext is enciphered by the second secret key. Further, the first decryption key and the second decryption key may be engaged in a non-associative octonion ring. For example, the first decryption may be represented by "$K_{DE}1(X)=B_i( \ldots (B_k(X) \ldots )$" and the second decryption may be represented by "$K_{DE}2(X)=B_k^{-1}( \ldots (B_1^{-1}X) \ldots )$". Further, first device 110 may be configured to transmit the first decryption key and the second decryption key to second device 120.

Further, first device 110 may be configured to generate and/or determine an enciphering function of first device 110, which may be engaged in a non-associative octonion ring, based at least in part on the system parameter and the first secret key. Further, first device 110 may be configured to encipher a plaintext into the first ciphertext, based at least in part on the enciphering function, the system parameter and the first secret key of first device 110. For example, the plaintext may include multiple plaintext elements which may be engaged in a non-associative octonion ring. Further, the first ciphertext may include multiple first ciphertext elements which may be engaged in a non-associative octonion ring. For example, the first ciphertext may be represented by "$E(M_i,X;A)$". For example, first device 110 may be configured to encipher the plaintext into the first ciphertext by using the below formula 4.

$$E(M_i, X; A) = \quad \text{[formula 4]}$$
$$A_1( \ldots (A_k(M_i(A_k^{-1}( \ldots (A_1^{-1}X) \ldots )\bmod q \in O[X],$$
$$= (ei_{00}x_0 + ei_{01}x_1 + \ldots + ei_{07}x_7,$$
$$ei_{10}x_0 + ei_{11}x_1 + \ldots + ei_{17}x_7,$$
$$\ldots$$
$$ei_{70}x_0 + ei_{71}x_1 + \ldots + ei_{77}x_7),$$
$$= [ei_{jk}](i=0, \ldots, n-1; j, k=0, \ldots, 7)$$
with $ei_{jk} \in Fq(i=0, \ldots, n-1; j, k=0, \ldots, 7)$ Further, first device 110 may be configured to transmit the first ciphertext "[$ei_{jk}$]" and the system parameter "[q]" to server 130. Further, first device 110 may be configured to transmit, to server 130, the first re-encryption key "$K_{RE}1(X)$" and the second re-encryption key "$K_{RE}2(X)$".

Server 130 may be configured to receive, from first device 110, the first ciphertext, the system parameter, the first re-encryption key and the second re-encryption key. Further, server 130 may be configured to convert the first ciphertext into the second ciphertext, based at least in part on the first re-encryption key and the second re-encryption key. For example, the second ciphertext may be represented by "$E(M_i,X;B)$". Thus, the first ciphertext to which the plaintext is enciphered by the first secret key may be replaced with the second ciphertext which is equal to a ciphertext to which the plaintext is enciphered by the second secret key and the system parameter. For example, the second ciphertext may include multiple second ciphertext elements which may be engaged in a non-associative octonion ring. Further, server 130 may be configured to transmit the second ciphertext to second device 120. For example, server 130 may be configured to convert the first ciphertext into the second ciphertext by using the below formula 5.

$$K_{RE}1(E(M_i,K_{RE}2(X);A))=E(M_i,X;B),(i=0,\ldots,n-1) \quad \text{[formula 5]}$$

Second device 120 may be configured to receive, from server 130, the second ciphertext "$E(M_i,X;B)$" to which the first ciphertext, to which the plaintext is enciphered by first device 110, is converted based on the first re-encryption key and the second re-encryption key. Further, second device 120 may be configured to receive, from first device 110, the first decryption key "$K_{DE}1(X)$" and the second decryption key "$K_{DE}2(X)$". Further, second device 120 may be configured to decipher the received second ciphertext to the plaintext, based on the received first decryption key and second decryption key. The second ciphertext is equal to a ciphertext to which the plaintext is enciphered by the second secret key and the system parameter. Thus, second device 120 may be configured to obtain the plaintext. For example, second device 120 may be configured to decipher the second ciphertext to the plaintext by using the below formula 6.

$$K_{DE}2(E(M_i,K_{RE}1(X);B))=M_i(i=0,\ldots,n-1) \quad \text{[formula 6]}$$

Figure 2:
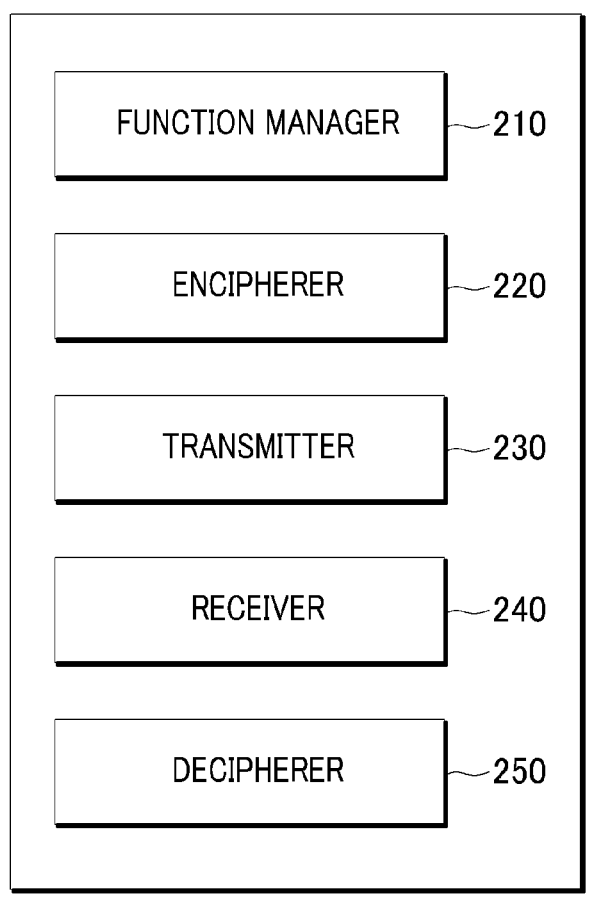
FIG. 2 shows a schematic block diagram illustrating an example architecture for a device, arranged in accordance with at least some embodiments described herein.

FIG. 2 shows a schematic block diagram illustrating an example architecture for a device, arranged in accordance with at least some embodiments described herein. As depicted in FIG. 2, for example, first device 110 may include a function manager 210, an encipherer 220, a transmitter 230, a receiver 240 and a decipherer 250. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of function manager 210, encipherer 220, transmitter 230, receiver 240 and decipherer 250 may be included in an instance of an application hosted by first device 110.

Function manager 210 may be configured to select a system parameter which is a prime number greater than two. Further, function manager 210 may be configured to select a secret key of first device 110, randomly. An inverse value of the secret key may exist, and the secret key may be engaged in a non-associative octonion ring. Further, function manager 210 may be configured to generate and/or determine an enciphering function and a deciphering function of first device 110, based at least in part on the system parameter and the secret key of first device 110.

Encipherer 220 may be configured to encipher a plaintext into a first ciphertext, based at least in part on the enciphering function, the system parameter and the secret key of first device 110. For example, the plaintext may include multiple plaintext elements which may be engaged in a non-associative octonion ring. Further, the first ciphertext may include multiple first ciphertext elements which may be engaged in a non-associative octonion ring.

Transmitter 230 may be configured to transmit the first ciphertext and the system parameter to server 130. Further, transmitter 230 may be configured to transmit, to second device 120, a request to process computations or calculations on the plaintext. For example, the request may include information regarding a kind of calculation (e.g., addition, subtraction, multiplication or division) and calculation targets (i.e., plaintext elements) from among the multiple plaintext elements. Further, for example, transmitter 230 may be configured to transmit, to second device 120, a request for an encrypted result of computations on the first ciphertext elements that correspond to the requested plaintext elements.

Receiver 240 may be configured to receive, from second device 120, a second ciphertext as the encrypted result to which the first ciphertext that corresponds to the requested plaintext has been processed and converted by second device 120. Second device 120 may be configured to execute computations or calculations on the first ciphertext that corresponds to the requested plaintext, based on the request transmitted by transmitter 230, and to generate the second ciphertext without deciphering the first ciphertext.

Decipherer 250 may be configured to decipher the second ciphertext, based at least in part on the system parameter, the secret key and the deciphering function. Decipherer 250 may be configured to then obtain a deciphered process result that may be equal to a result of the requested computations or calculations on the requested plaintext.

Figure 3:
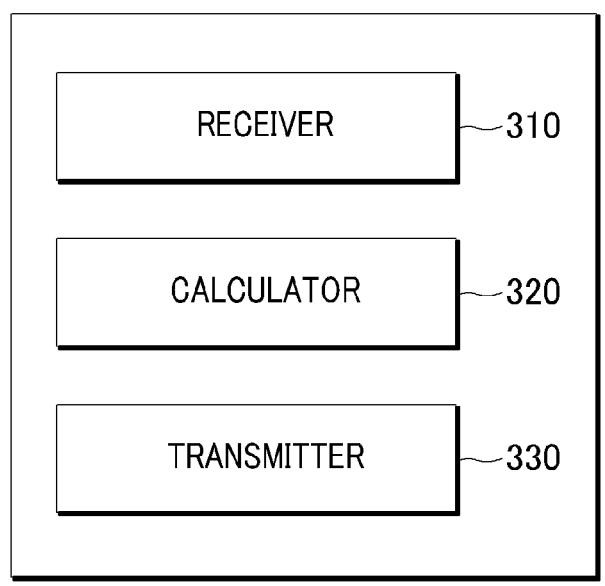
FIG. 3 shows a schematic block diagram illustrating another example architecture for a device, arranged in accordance with at least some embodiments described herein.

FIG. 3 shows a schematic block diagram illustrating another example architecture for a device, arranged in accordance with at least some embodiments described herein. As depicted in FIG. 3, for example, first device 110 may include a receiver 310, a calculator 320 and a transmitter 330. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiver 310, calculator 320 and transmitter 330 may be included in an instance of an application hosted by first device 110.

Receiver 310 may be configured to receive, from second device 120, a request to process computations or calculations on a plaintext. For example, the plaintext may include multiple plaintext elements which may be engaged in a non-associative octonion ring. Further, for example, the request may include information regarding a kind of calculation (e.g., addition, subtraction, multiplication or division) and calculation targets (i.e., plaintext elements) from among the multiple plaintext elements.

Further, receiver 310 may be configured to download, from server 130, a system parameter and a first ciphertext that corresponds to the requested plaintext, based at least in part on the received request. For example, receiver 310 may be configured to download, from server 130, multiple first ciphertext elements that correspond to multiple plaintext elements which are requested to be processed. The system parameter which is a prime number greater than two. The first ciphertext may be a ciphertext to which the plaintext is enciphered by second device 120 based on the system parameter, a secret key of second device 120 and an enciphering function of second device 120.

Calculator 320 may be configured to calculate the first ciphertext that corresponds to the requested plaintext to generate a second ciphertext, based on the request received by receiver 310. Calculator 320 may be configured to process computations or calculations on the first ciphertext without decrypting the first ciphertext, and to generate an encrypted result (i.e., the second ciphertext) of the calculations.

Transmitter 330 may be configured to transmit the second ciphertext to second device 120. Then, second device 120 may be configured to receive the second ciphertext as the encrypted result of the requested calculations, to which the first ciphertext associated with the requested plaintext has been processed and converted. Further, second device 120 may be configured to decipher the second ciphertext. Thus, second device 120 may be configured to obtain a deciphered process result that may be equal to a result of the requested computations or calculations on the requested plaintext without revealing original plaintexts to first device 110.

Figure 4:
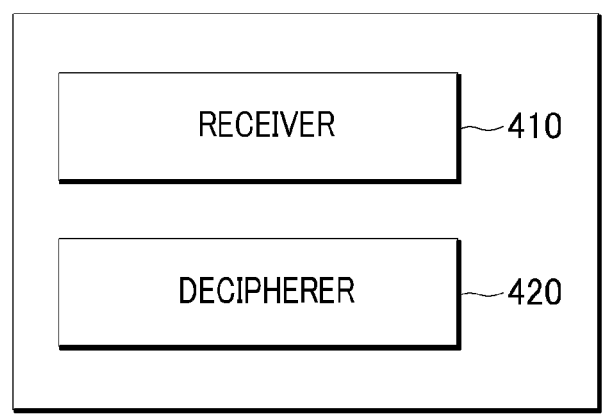
FIG. 4 shows a schematic block diagram illustrating still another example architecture for a device, arranged in accordance with at least some embodiments described herein.

FIG. 4 shows a schematic block diagram illustrating still another example architecture for a device, arranged in accordance with at least some embodiments described herein. As depicted in FIG. 4, for example, first device 110 may include a receiver 410 and a decipherer 420. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiver 410 and decipherer 420 may be included in an instance of an application hosted by first device 110.

Receiver 410 may be configured to receive, from server 130, a first ciphertext to which a second ciphertext is converted based at least in part on a first re-encryption key and a second re-encryption key. The second ciphertext may be a ciphertext to which a plaintext is enciphered by second device 120, based at least in part on a first secret key of second device 120. The second ciphertext may be transmitted from second device 120 to server 130. Further, the second ciphertext to which the plaintext is enciphered by the first secret key may be replaced with the first ciphertext which is equal to a ciphertext to which the plaintext is enciphered by a second secret key of second device 120. Server 130 may be configured to replace the second ciphertext with the first ciphertext, based on the first re-encryption key and the second re-encryption key. The first re-encryption key and the second re-encryption key may be generated by second device 120, based at least in part on a system parameter, the first secret key of second device 120 and the second secret key of second device 120.

Further, receiver 410 may be configured to receive, from second device 120, a first decryption key and a second decryption key. The first decryption key and the second decryption key may be generated by second device 120, based at least in part on the second secret key of second device 120 and the system parameter. The first decryption key and the second decryption key may refer to keys to be used to decipher the first ciphertext to which the plaintext is enciphered by the second secret key.

Decipherer 420 may be configured to decipher the received first ciphertext to the plaintext, based on the first decryption key and the second decryption key received by receiver 410. The first ciphertext is equal to a ciphertext to which the plaintext is enciphered by the second secret key of second device 120 and the system parameter. Thus, decipherer 420 may be configured to obtain the plaintext.

Figure 5:
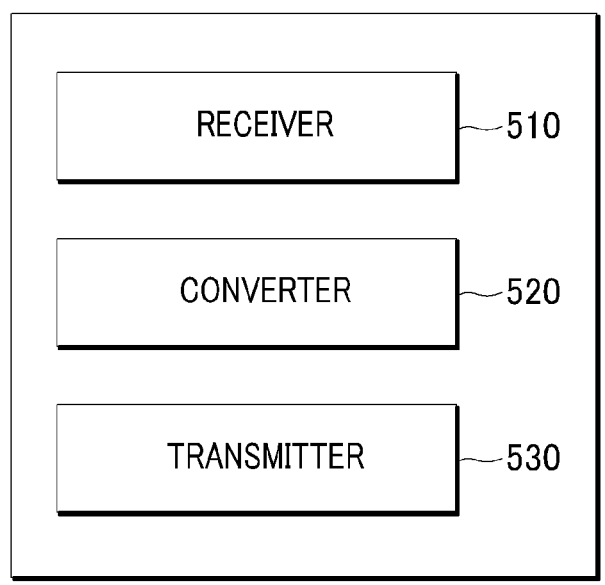
FIG. 5 shows a schematic block diagram illustrating an example architecture for a server, arranged in accordance with at least some embodiments described herein.

FIG. 5 shows a schematic block diagram illustrating an example architecture for a server 130, arranged in accordance with at least some embodiments described herein. As depicted in FIG. 5, server 130 may include a receiver 510, a converter 520 and a transmitter 530. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiver 510, converter 520 and transmitter 530 may be included in an instance of an application hosted by server 130.

Receiver 510 may be configured to receive, from first device 110, a system parameter which is a prime number greater than two. Further, receiver 510 may be configured to receive, from first device 110, a first ciphertext to which a plaintext is enciphered based at least in part on the system parameter and a first secret key of first device 110. Further, receiver 510 may be configured to receive, from first device 110, a first re-encryption key and a second re-encryption key. The first re-encryption key and the second re-encryption key may be generated by first device 110, based at least in part on the system parameter, the first secret key of first device 110 and a second secret key of first device 110. The first re-encryption key and the second re-encryption key may refer to keys to be used to convert the first ciphertext which is enciphered by the first secret key into a second ciphertext which is enciphered by the second secret key of first device 110.

Converter 520 may be configured to convert the first ciphertext into the second ciphertext, based at least in part on the first re-encryption key and the second re-encryption key. Thus, the first ciphertext to which the plaintext is enciphered by the first secret key may be replaced with the second ciphertext which is equal to a ciphertext to which the plaintext is enciphered by the second secret key.

Transmitter 530 may be configured to transmit the second ciphertext to second device 120. Then, second device 120 may be configured to receive the second ciphertext, and to decipher the received second ciphertext to the plaintext, based on a first decryption key and a second decryption key. The second ciphertext is equal to a ciphertext to which the plaintext is enciphered by the second secret key of first device 110. Further, the first decryption key and the second decryption key may refer to keys to be used to decipher the second ciphertext to which the plaintext is enciphered by the second secret key. Thus, second device 120 may be configured to obtain the plaintext.

Figure 6:
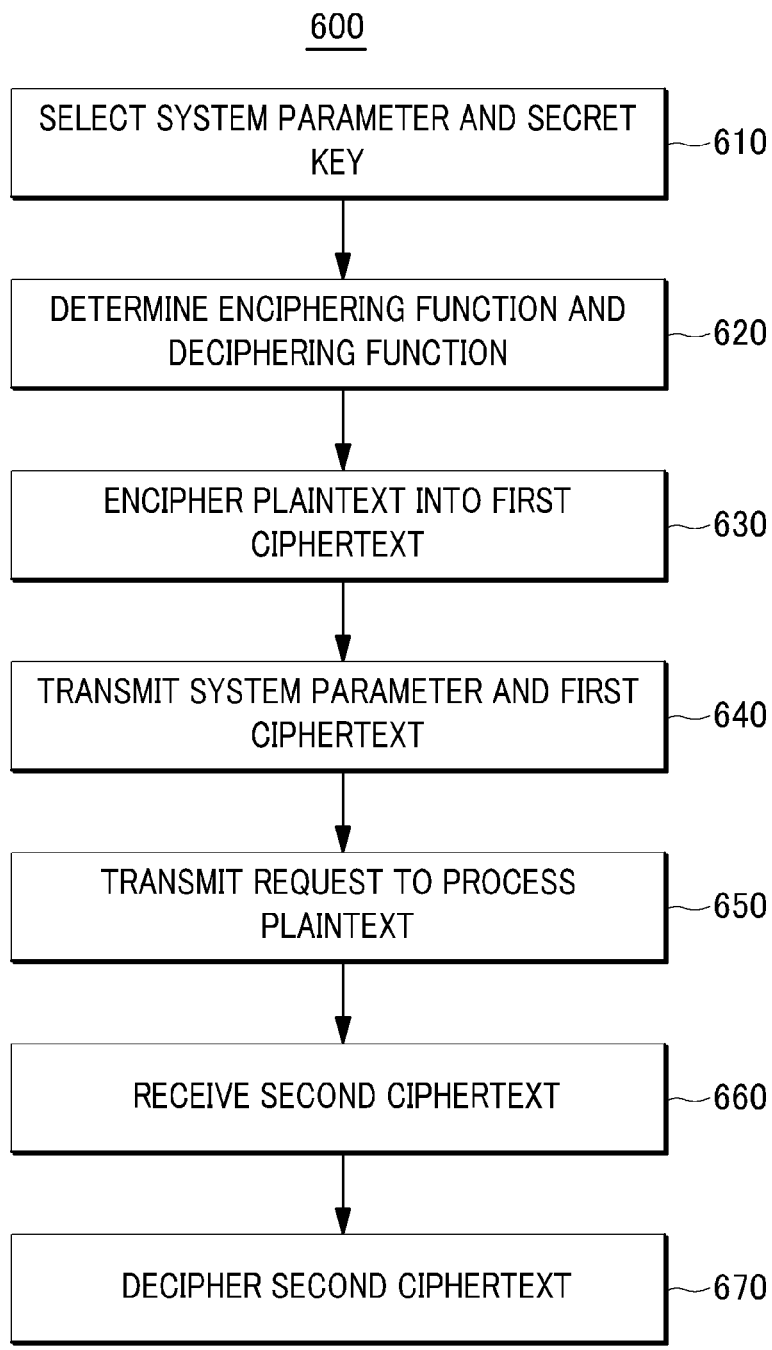
FIG. 6 schematically shows an example flow diagram of a process of a device to implement a homomorphic encryption scheme, arranged in accordance with at least some embodiments described herein.

FIG. 6 schematically shows an example flow diagram of a process 600 of a device to implement a homomorphic encryption scheme, arranged in accordance with at least some embodiments described herein. The operations of process 600 may be implemented by system 10 including first device 110, second device 120 and server 130, as illustrated in FIG. 1. Process 600 may include one or more operations, actions, or functions as illustrated by one or more blocks 610, 620, 630, 640, 650 and/or 660. Although illustrated as discrete blocks, various blocks may be divided into additional blocks, combined into fewer blocks, or eliminated, depending on the desired implementation. Processing may begin at block 610.

At block 610 (Select System Parameter and Secret Key), first device 110 may select a system parameter and a secret key of first device 110. The system parameter may be a prime number greater than two. Further, the system parameter and the secret key may be engaged in a non-associative octonion ring. Processing may proceed from block 610 to block 620.

At block 620 (Determine Enciphering Function and Deciphering Function), first device 110 may determine an enciphering function and a deciphering function of first device 110, which may be engaged in a non-associative octonion ring, based at least in part on the system parameter and the secret key selected at block 610. Processing may proceed from block 620 to block 630.

At block 630 (Encipher Plaintext into First Ciphertext), first device 110 may encipher a plaintext into a first ciphertext, based at least in part on the enciphering function, the system parameter and the secret key of first device 110. For example, the plaintext may include multiple plaintext elements which may be engaged in a non-associative octonion ring. Further, the first ciphertext may include multiple first ciphertext elements which may be engaged in a non-associative octonion ring. Processing may proceed from block 630 to block 640.

At block 640 (Transmit System Parameter and First Ciphertext), first device 110 may transmit the first ciphertext and the system parameter to server 130. Processing may proceed from block 640 to block 650.

At block 650 (Transmit Request to Process Plaintext), first device 110 may transmit, to second device 120, a request to process computations or calculations on the plaintext. For example, the request may include information regarding a kind of calculation (e.g., addition, subtraction, multiplication or division) and calculation targets (i.e., plaintext elements) from among the multiple plaintext elements. At block 650, first device 110 may transmit, to second device 120, a request for an encrypted result of computations on the first ciphertext elements that correspond to the requested plaintext elements. Processing may proceed from block 650 to block 660.

At block 660 (Receive Second Ciphertext), first device 110 may receive, from second device 120, a second ciphertext as the encrypted result to which the first ciphertext that corresponds to the requested plaintext has been processed and converted by second device 120. Second device 120 may execute the requested computations or calculations on the first ciphertext that corresponds to the requested plaintext, based on the request transmitted at block 650, and generate the second ciphertext without deciphering the first ciphertext, and transmit the generated second ciphertext to first device 110. Processing may proceed from block 660 to block 670.

At block 670 (Decipher Second Ciphertext), first device 110 may decipher the second ciphertext received at block 660, based at least in part on the system parameter and the deciphering function. First device 110 may obtain a deciphered process result that may be equal to a result of the requested computations or calculations on the requested plaintext. Thus, based on a fully homomorphic encryption scheme, first device 110 may obtain a calculation result of encrypted plaintexts without revealing original plaintexts to second device 120, and may obtain a calculation result of the original plaintexts by deciphering the calculation result of encrypted plaintexts.

Figure 7:
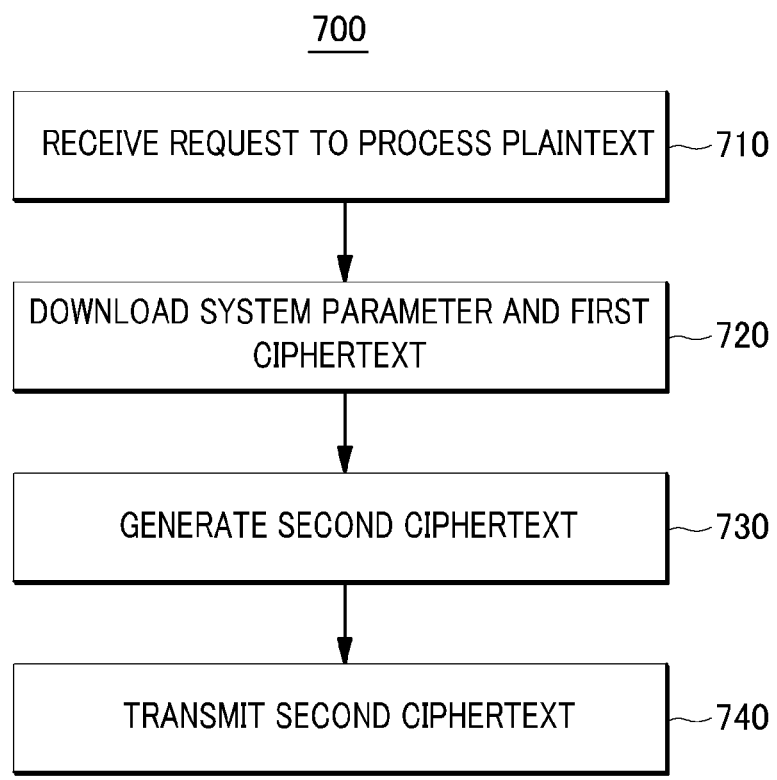
FIG. 7 schematically shows another example flow diagram of a process of a device to implement a homomorphic encryption scheme, arranged in accordance with at least some embodiments described herein.

FIG. 7 schematically shows another example flow diagram of a process 700 of a device to implement a homomorphic encryption scheme, arranged in accordance with at least some embodiments described herein. The operations of process 700 may be implemented by system 10 including first device 110, second device 120 and server 130, as illustrated in FIG. 1. Process 700 may include one or more operations, actions, or functions as illustrated by one or more blocks 710, 720, 730 and/or 740. Although illustrated as discrete blocks, various blocks may be divided into additional blocks, combined into fewer blocks, or eliminated, depending on the desired implementation. Processing may begin at block 710.

At block 710 (Receive Request to Process Plaintext), first device 110 may receive, from second device 120, a request to process computations or calculations on a plaintext. For example, the plaintext may include multiple plaintext elements which may be engaged in a non-associative octonion ring. Further, for example, the request may include information regarding a kind of calculation (e.g., addition, subtraction, multiplication or division) and calculation targets (i.e., plaintext elements) from among the multiple plaintext elements. Processing may proceed from block 710 to block 720.

At block 720 (Download System Parameter and First Ciphertext), first device 110 may download, from server 130, a system parameter and a first ciphertext that corresponds to the requested plaintext, based at least in part on the request received at block 710. For example, first device 110 may download, from server 130, multiple first ciphertext elements that correspond to multiple plaintext elements which are requested to be processed. The system parameter which is a prime number greater than two. The first ciphertext may be a ciphertext to which the plaintext is enciphered by second device 120, based on the system parameter, a secret key of second device 120 and an enciphering function of second device 120. Processing may proceed from block 720 to block 730.

At block 730 (Generate Second Ciphertext), first device 110 may generate a second ciphertext by calculating the first ciphertext that corresponds to the requested plaintext, based on the request received at block 710. First device 110 may process computations or calculations on the first ciphertext without decrypting the first ciphertext, and generate an encrypted result (i.e., the second ciphertext) of the calculations. Processing may proceed from block 730 to block 740.

At block 740 (Transmit Second Ciphertext), first device 110 may transmit the second ciphertext generated at block 730 to second device 120. Then, second device 120 may receive the second ciphertext as the encrypted result of the requested calculations, to which the first ciphertext associated with the requested plaintext has been processed and converted. Further, second device 120 may decipher the second ciphertext. Thus, second device 120 may obtain a deciphered process result that may be equal to a result of computations or calculations on the requested plaintext without revealing original plaintexts to first device 110.

Figure 8:
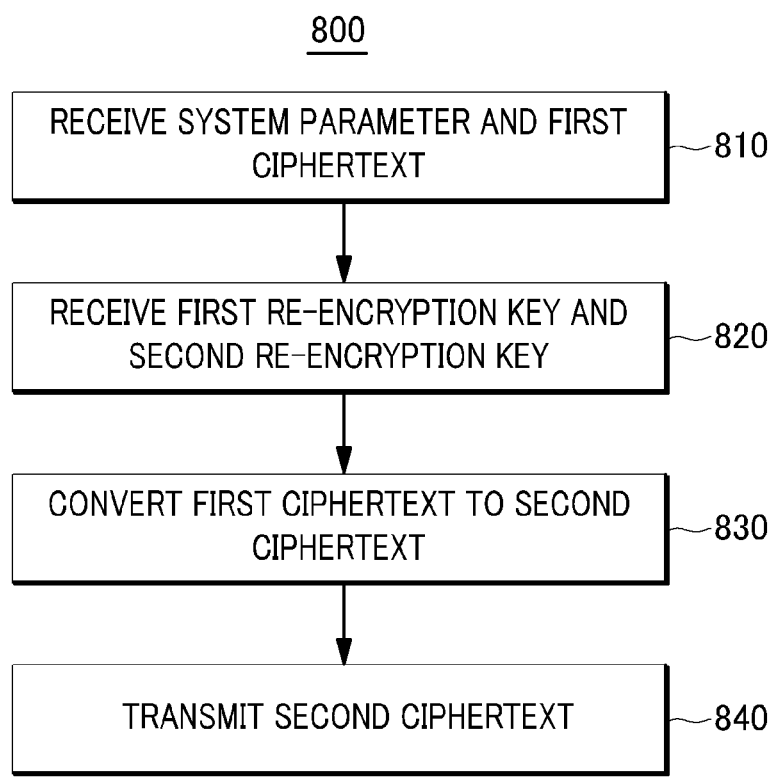
FIG. 8 schematically shows still another example flow diagram of a process of a server to implement a homomorphic encryption scheme, arranged in accordance with at least some embodiments described herein.

FIG. 8 schematically shows still another example flow diagram of a process 800 of a server to implement a homomorphic encryption scheme, arranged in accordance with at least some embodiments described herein. The operations of process 800 may be implemented by system 10 including first device 110, second device 120 and server 130, as illustrated in FIG. 1. Process 800 may include one or more operations, actions, or functions as illustrated by one or more blocks 810, 820, 830 and/or 840. Although illustrated as discrete blocks, various blocks may be divided into additional blocks, combined into fewer blocks, or eliminated, depending on the desired implementation. Processing may begin at block 810.

At block 810 (Receive System Parameter and First Ciphertext), server 130 may receive, from first device 110, a system parameter which is a prime number greater than two. Further, server 130 may receive, from first device 110, a first ciphertext to which a plaintext is enciphered based at least in part on the system parameter and a first secret key of first device 110. Processing may proceed from block 810 to block 820.

At block 820 (Receive First Re-Encryption Key and Second Re-Encryption Key), server 130 may receive, from first device 110, a first re-encryption key and a second re-encryption key. The first re-encryption key and the second re-encryption key may be generated by first device 110, based at least in part on the system parameter, the first secret key of first device 110 and a second secret key of first device 110. The first re-encryption key and the second re-encryption key may refer to keys to be used to convert the first ciphertext which is enciphered by the first secret key into a second ciphertext which is enciphered by the second secret key. Processing may proceed from block 820 to block 830.

At block 830 (Convert First Ciphertext to Second Ciphertext), server 130 may convert the first ciphertext to the second ciphertext, based at least in part on the first re-encryption key and the second re-encryption key received at block 820. Thus, the first ciphertext to which the plaintext is enciphered by the first secret key may be replaced with the second ciphertext which is equal to a ciphertext to which the plaintext is enciphered by the second secret key of first device 110. Processing may proceed from block 830 to block 840.

At block 840 (Transmit Second Ciphertext), server 130 may transmit the second ciphertext to second device 120. Then, second device 120 may receive the second ciphertext, and decipher the second ciphertext to the plaintext, based on a first decryption key and a second decryption key of first device 110. The second ciphertext is equal to a ciphertext to which the plaintext is enciphered by the second secret key of first device 110. Further, the first decryption key and the second decryption key may refer to keys to be used to decipher the second ciphertext to which the plaintext is enciphered by the second secret key of first device 110. Thus, second device 120 may obtain the plaintext.

Figure 9:
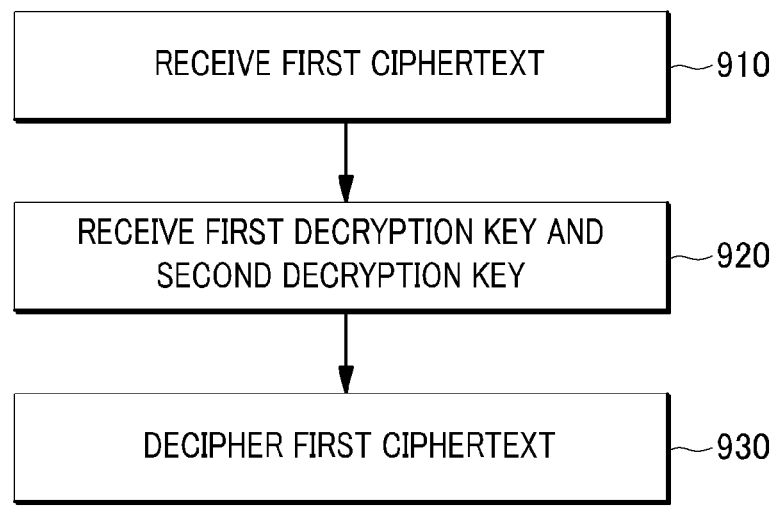
FIG. 9 schematically shows still another example flow diagram of a process of a device to implement a homomorphic encryption scheme, arranged in accordance with at least some embodiments described herein.

FIG. 9 schematically shows still another example flow diagram of a process 900 of a device to implement a homomorphic encryption scheme, arranged in accordance with at least some embodiments described herein. The operations of process 900 may be implemented by system 10 including first device 110, second device 120 and server 130, as illustrated in FIG. 1. Process 900 may include one or more operations, actions, or functions as illustrated by one or more blocks 910, 920 and/or 930. Although illustrated as discrete blocks, various blocks may be divided into additional blocks, combined into fewer blocks, or eliminated, depending on the desired implementation. Processing may begin at block 910.

At block 910 (Receive First Ciphertext), first device 110 may receive, from server 130, a first ciphertext to which a second ciphertext is converted based at least in part on a first re-encryption key and a second re-encryption key. The second ciphertext may be a ciphertext to which a plaintext is enciphered by second device 120, based at least in part on a first secret key of second device 120. The second ciphertext may be transmitted from second device 120 to server 130. Further, the second ciphertext to which the plaintext is enciphered by the first secret key may be replaced with the first ciphertext which is equal to a ciphertext to which the plaintext is enciphered by a second secret key of second device 120. Server 130 may replace the second ciphertext with the first ciphertext, based on the first re-encryption key and the second re-encryption key. Further, server 130 may transmit the first ciphertext to first device 110. The first re-encryption key and the second re-encryption key may be generated by second device 120, based at least in part on a system parameter, the first secret key of second device 120 and the second secret key of second device 120. Processing may proceed from block 910 to block 920.

At block 920 (Receive First Decryption Key and Second Decryption Key), first device 110 may receive, from second device 120, a first decryption key and a second decryption key. The first decryption key and the second decryption key may be generated by second device 120, based at least in part on the second secret key of second device 120 and the system parameter. The first decryption key and the second decryption key may refer to keys to be used to decipher the first ciphertext to which the plaintext is enciphered by the second secret key of second device 120. Processing may proceed from block 920 to block 930.

At block 930 (Decipher First Ciphertext), first device 110 may decipher the first ciphertext received at block 910 to the plaintext, based on the first decryption key and the second decryption key received at block 920. The first ciphertext is equal to a ciphertext to which the plaintext is enciphered by the second secret key of second device 120 and the system parameter. Thus, decipherer 420 may be configured to obtain the plaintext.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
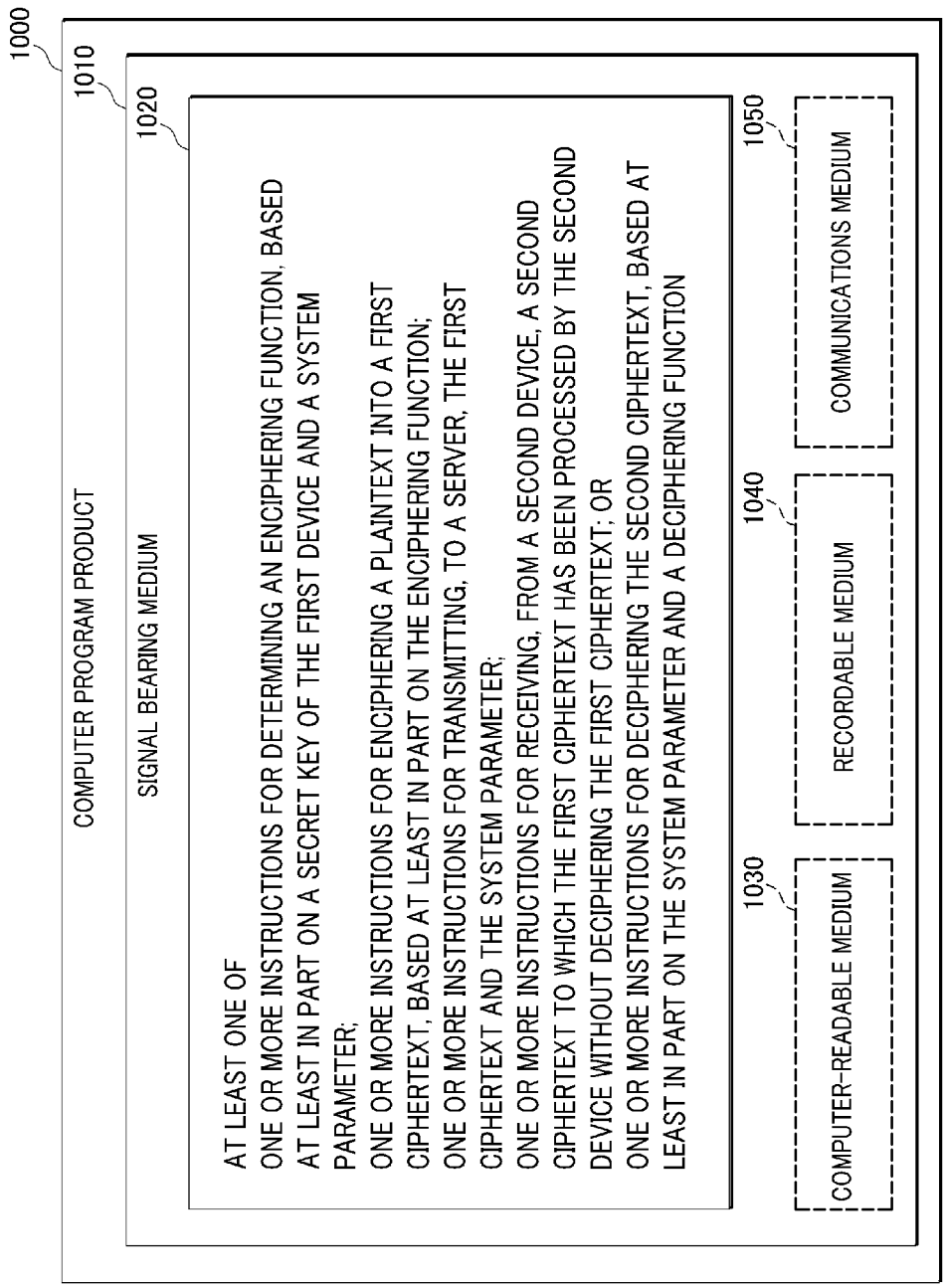
FIG. 10 illustrates computer program products that may be utilized to provide a homomorphic encryption scheme, arranged in accordance with at least some embodiments described herein.

FIG. 10 illustrates computer program products that may be utilized to provide a homomorphic encryption scheme, arranged in accordance with at least some embodiments described herein. Program product 1000 may include a signal bearing medium 1010. Signal bearing medium 1010 may include one or more instructions 1020 that, when executed by, for example, a first device, may provide the functionality described above with respect to FIGS. 1-9. By way of example, instructions 1020 may include: one or more instructions for determining an enciphering function, based at least in part on a secret key of the first device and a system parameter; one or more instructions for enciphering a plaintext into a first ciphertext, based at least in part on the enciphering function; one or more instructions for transmitting, to a server, the first ciphertext and the system parameter; one or more instructions for receiving, from a second device, a second ciphertext to which the first ciphertext has been processed by the second device without deciphering the first ciphertext; or one or more instructions for deciphering the second ciphertext, based at least in part on the system parameter and a deciphering function. Thus, for example, referring to FIG. 2, first device 110 may undertake one or more of the blocks shown in FIG. 6 in response to instructions 1020.

In some implementations, signal bearing medium 1010 may encompass a computer-readable medium 1030, such as, but not limited to, a hard disk drive, a CD, a DVD, a digital tape, memory, etc. In some implementations, signal bearing medium 1010 may encompass a recordable medium 1040, such as, but not limited to, memory, read/write (R/W) CDs, R/W DVDs, etc. In some implementations, signal bearing medium 1010 may encompass a communications medium 1050, such as, but not limited to, a digital and/or an analog communication medium (e.g., a fiber optic cable, a waveguide, a wired communications link, a wireless communication link, etc.). Thus, for example, program product 1000 may be conveyed to one or more modules of first device 110 or server 130 by an RF signal bearing medium 1020, where the signal bearing medium 1020 is conveyed by a wireless communications medium 1050 (e.g., a wireless communications medium conforming with the IEEE 802.11 standard).

Figure 11:
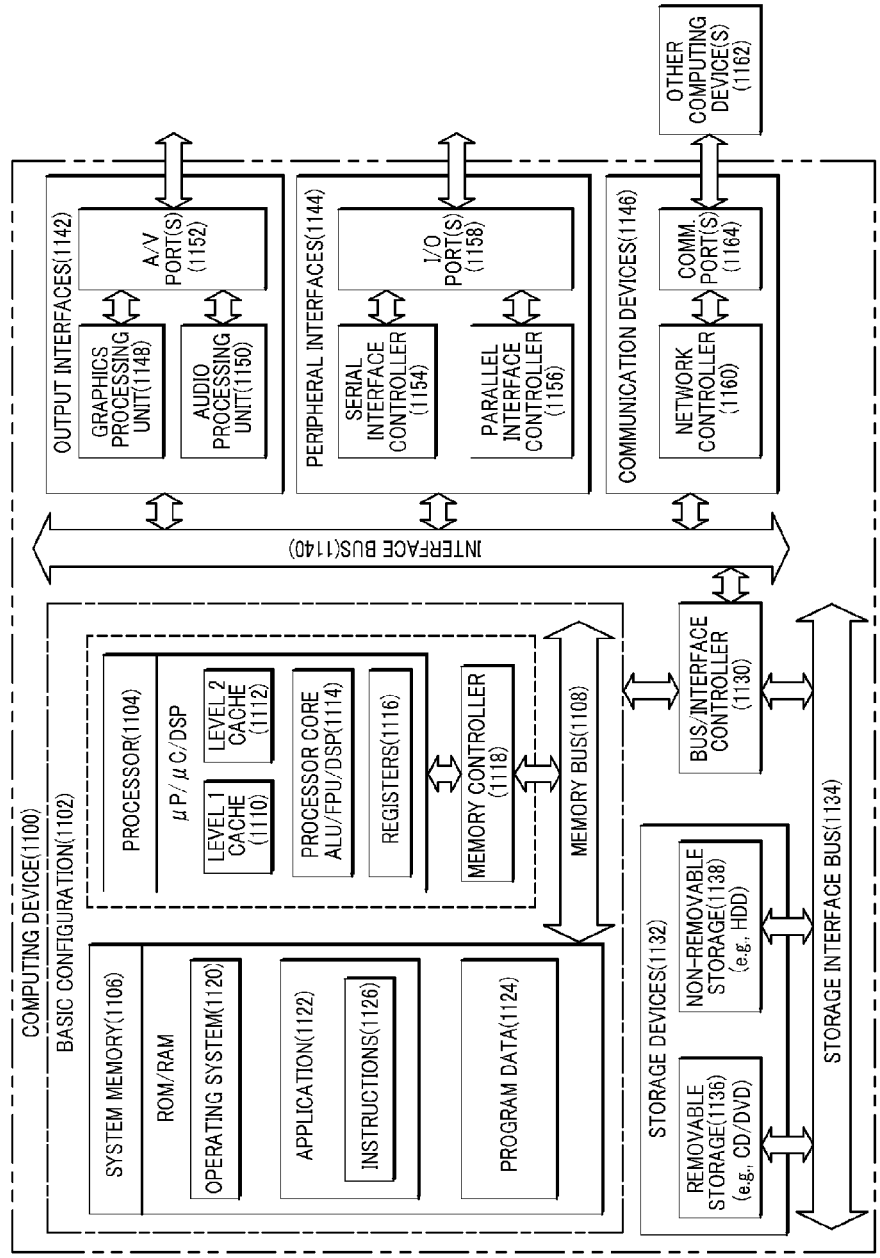
FIG. 11 is a block diagram illustrating an example computing device that may be utilized to provide a homomorphic encryption scheme, arranged in accordance with at least some embodiments described herein.

FIG. 11 is a block diagram illustrating an example computing device that may be utilized to provide a homomorphic encryption scheme, arranged in accordance with at least some embodiments described herein. In these examples, elements of computing device 1100 may be arranged or configured for a device. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (µP), a microcontroller (µC), a digital signal processor (DSP), or any combination thereof. Processor 1104 may include one more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP Core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), nonvolatile memory (such as ROM, flash memory, etc.) or any combination thereof. System memory 1106 may include an operating system 1120, one or more applications 1122, and program data 1124. Application 1122 may include instructions 1126 that may be arranged to perform the functions as described herein including the actions described with respect to first device or server architectures as shown in FIGS. 2-5 or including the actions described with respect to the flow charts shown in FIGS. 6-9. In some examples, application 1122 may be arranged to operate with program data 1124 on an operating system 1120 such that the fully homomorphic encryption scheme as described herein may be provided.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output interfaces 1142, peripheral interfaces 1144, and communication devices 1146) to basic configuration 1102 via bus/interface controller 1130. Example output interfaces 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a first device, the method comprising:
    determining an enciphering function, based at least in part on a secret key of the first device and a system parameter;
    enciphering a plaintext into a first ciphertext, based at least in part on the enciphering function;
    transmitting, to a server, the first ciphertext and the system parameter;
    transmitting, to a second device, a request to process the plaintext, wherein the first ciphertext, which corresponds to the plaintext, is processed to a second ciphertext by the second device, based at least in part on the request, and wherein the request includes a type of calculations to be performed on particular plaintext elements among multiple plaintext elements of the plaintext;
    receiving, from the second device, the second ciphertext to which the first ciphertext has been processed by the second device without deciphering the first ciphertext wherein the transmission of the request to process the first ciphertext to the second ciphertext without deciphering the first ciphertext facilitates the plaintext to be hidden from the second device, to enable protection against attacks on the plaintext; and
    deciphering the second ciphertext, based at least in part on the system parameter and a deciphering function.

2. The method of claim 1, further comprising:
    selecting the secret key and the system parameter.

3. The method of claim 1, wherein at least one of: the secret key, the system parameter, the plaintext, the first ciphertext, the second ciphertext, the enciphering function, or the deciphering function is engaged in a non-associative octonion ring.

4. The method of claim 1,
    wherein the deciphering the second ciphertext includes obtaining a process result of the plaintext.

5. The method of claim 1, further comprising:
    determining the deciphering function, based at least in part on the secret key and the system parameter.

6. The method of claim 1, wherein the server is part of a cloud datacenter.

7. A method performed under control of a first device, the method comprising:
    receiving, from a second device, a request to process a plaintext;
    downloading, from a server and based at least in part on the received request, a system parameter and a first ciphertext that corresponds to the plaintext;
    generating a second ciphertext by processing the first ciphertext, which corresponds to the plaintext, without deciphering the first ciphertext, based at least in part on the received request,
    wherein processing the first ciphertext without deciphering the first ciphertext facilitates the plaintext to be hidden from the first device, which leads to protection attacks on the plaintext; and
    transmitting, to the second device, the generated second ciphertext.

8. The method of claim 7, wherein at least one of: the system parameter, the plaintext, the first ciphertext, or the second ciphertext is engaged in a non-associative octonion ring.

9. The method of claim 7, wherein the plaintext is enciphered to the first ciphertext by the second device, based at least in part on the system parameter and a secret key of the second device.

10. A first device, comprising:
    a function manager configured to determine an enciphering function, based at least in part on a secret key of the first device and a system parameter;
    an encipherer, communicatively coupled to the function manager and configured to encipher, based at least in part on the enciphering function, a plaintext into a first ciphertext;
    a transmitter, communicatively coupled to the encipherer and configured to transmit, to a server, the first ciphertext and the system parameter,
    wherein the transmitter is further configured to transmit, to a second device, a request to process the plaintext, wherein the first ciphertext, which corresponds to the plaintext, is processed to a second ciphertext by the second device, based at least in part on the request, and wherein the request includes a type of calculations to be performed on particular plaintext elements among multiple plaintext elements of the plaintext;

a receiver, communicatively coupled to the transmitter and configured to receive, from the second device, the second ciphertext to which the first ciphertext has been processed by the second device without deciphering the first ciphertext, wherein the transmission of the request to process the first ciphertext to the second ciphertext without deciphering the first ciphertext facilitates the plaintext to be hidden from the second device, to enable protection against attacks on the plaintext; and a decipherer, communicatively coupled to the receiver and configured to decipher the second ciphertext, based at least in part on the system parameter and a deciphering function.

11. The first device of claim 10, wherein the decipherer is further configured to obtain a process result of the plaintext.

* * * * *